United States Patent [19]
Bergeron et al.

[11] Patent Number: 5,265,075
[45] Date of Patent: Nov. 23, 1993

[54] VOICE PROCESSING SYSTEM WITH EDITABLE VOICE FILES

[75] Inventors: Lawrence E. Bergeron, Trumbull; Anthony Ciaraldi, Stamford; Simon L. Howes, Monroe, all of Conn.

[73] Assignee: Dictaphone Corporation, Stratford, Conn.

[21] Appl. No.: 757,762

[22] Filed: Sep. 11, 1991

[51] Int. Cl.$^5$ .............................................. G11B 19/02
[52] U.S. Cl. ........................................ 369/25; 369/29; 379/75
[58] Field of Search ....................... 369/25, 29, 27, 28; 379/67, 75, 88, 89; 395/2

[56] References Cited

U.S. PATENT DOCUMENTS

| | | | |
|---|---|---|---|
| 3,749,849 | 7/1973 | Kolpek et al. | 179/100.2 |
| 3,777,072 | 12/1973 | Kolpek et al. | 179/100.2 |
| 4,375,083 | 2/1983 | Maxemchuk | 364/900 |
| 4,627,001 | 12/1986 | Stapleford et al. | 369/29 |
| 4,779,209 | 10/1988 | Stapleford et al. | 369/DIG. 2 |
| 4,853,952 | 8/1989 | Jachmann et al. | 379/88 |
| 4,860,339 | 8/1989 | D'Agosto, III et al. | 379/67 |
| 5,003,575 | 3/1991 | Chamberlin et al. | 379/89 |
| 5,008,835 | 4/1991 | Jachmann et al. | 364/513.5 |
| 5,163,085 | 11/1992 | Sweet et al. | 379/75 |
| 5,179,627 | 1/1993 | Sweet et al. | 379/89 |

Primary Examiner—Robert J. Pascal
Assistant Examiner—Tan Dinh
Attorney, Agent, or Firm—Robert H. Whisker; Melvin J. Scolnick

[57] ABSTRACT

A central dictation system includes apparatus for prerecording standard voice files. Users of the system may select one of the prerecorded files. The selected file is copied to a new file, which the user is free to edit. The edited file is assigned to a transcriptionist or is accessible to an authorized listener, in the same manner as a conventional dictation job. The prerecorded standard files may contain, for example, standard radiology reports tailored to each user's preferences. Alternatively, the recorded files may contain questions or prompts that guide users to dictate information required to complete preprinted report forms.

24 Claims, 7 Drawing Sheets

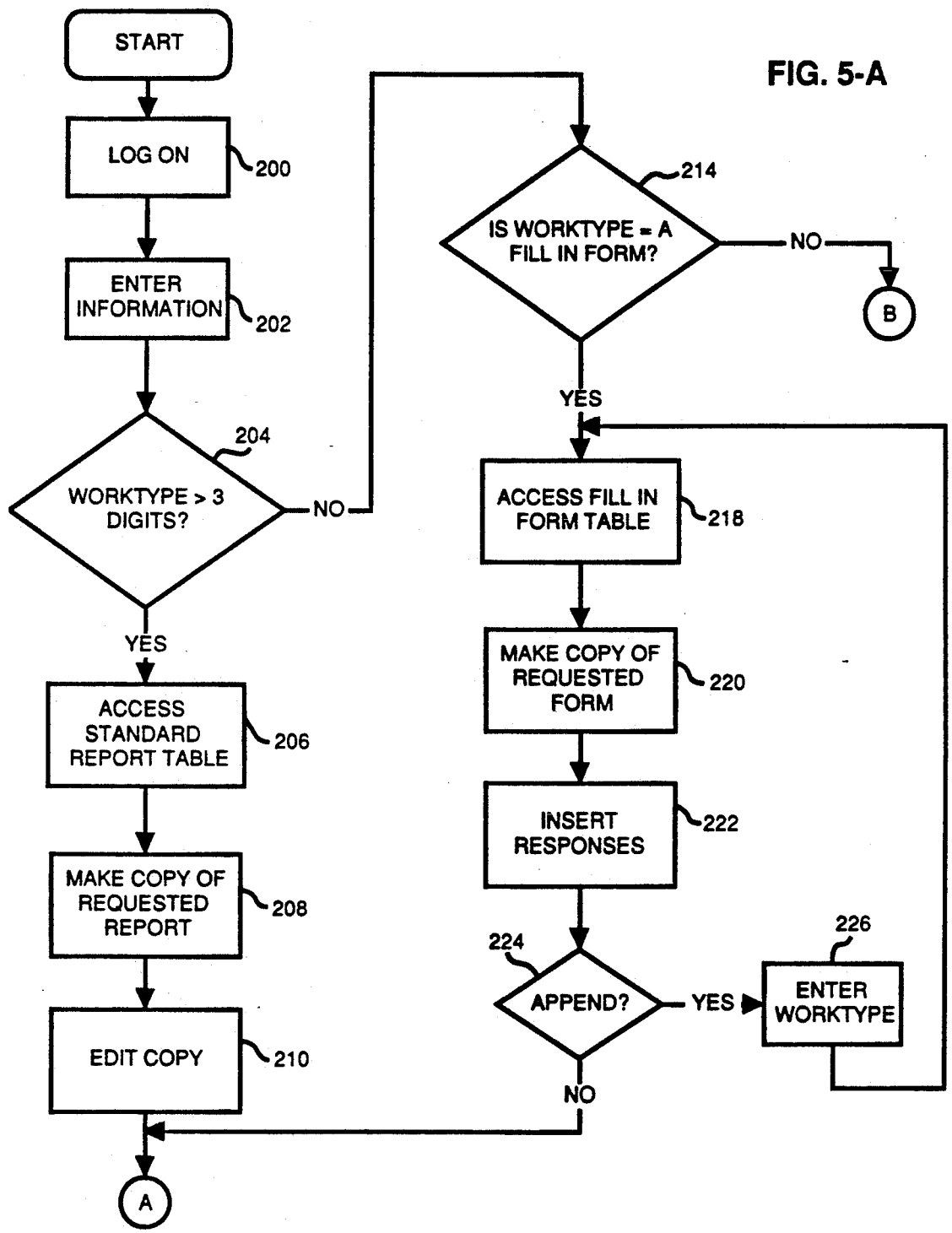
FIG. 5-A

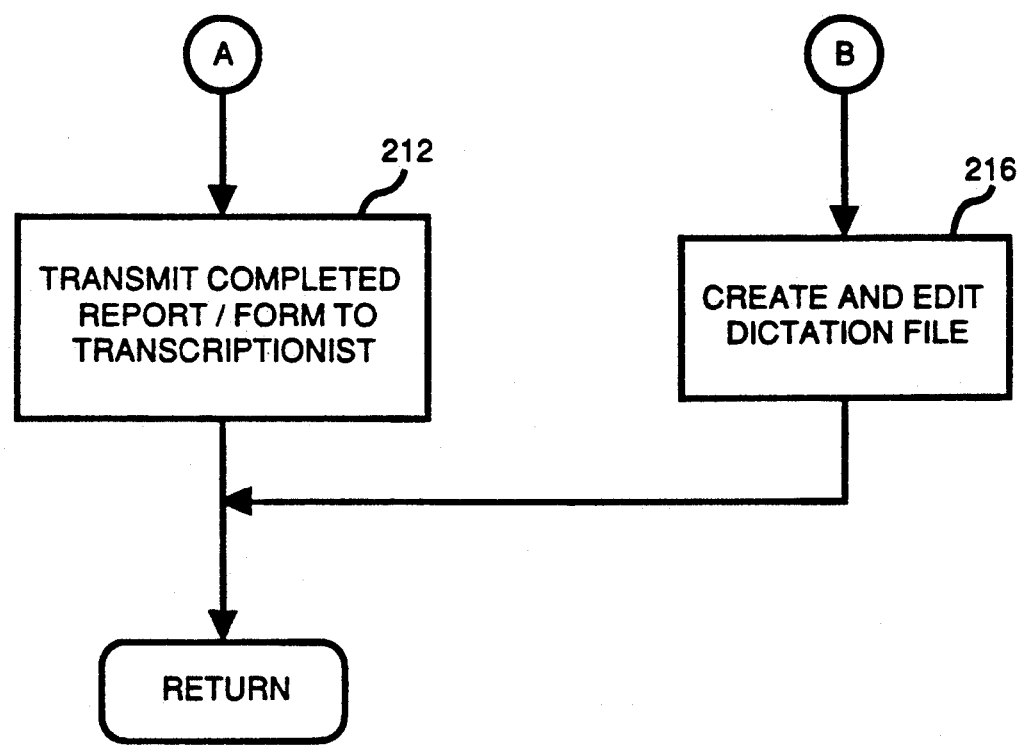
FIG. 5-B

FIG. 6-A
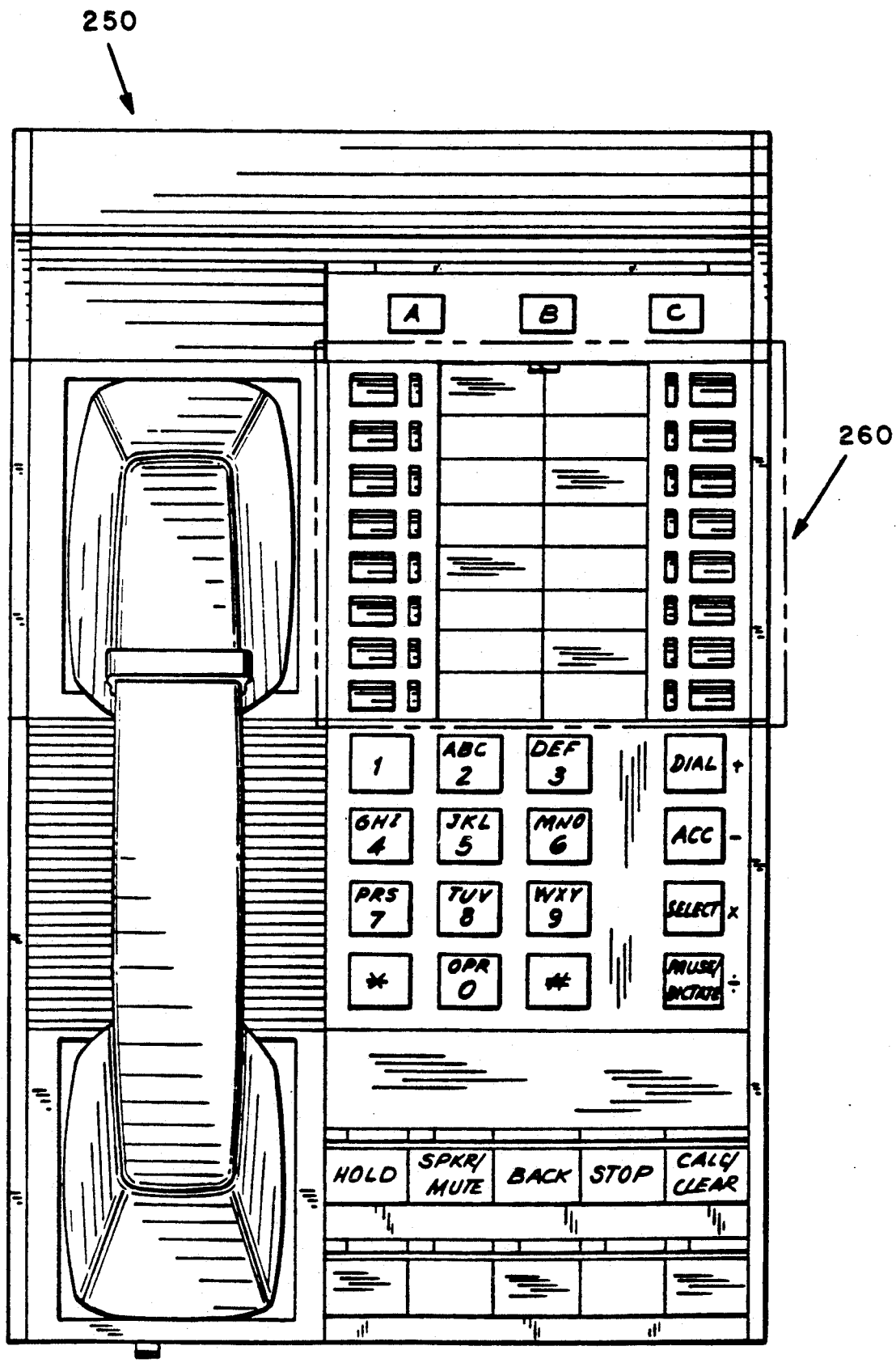

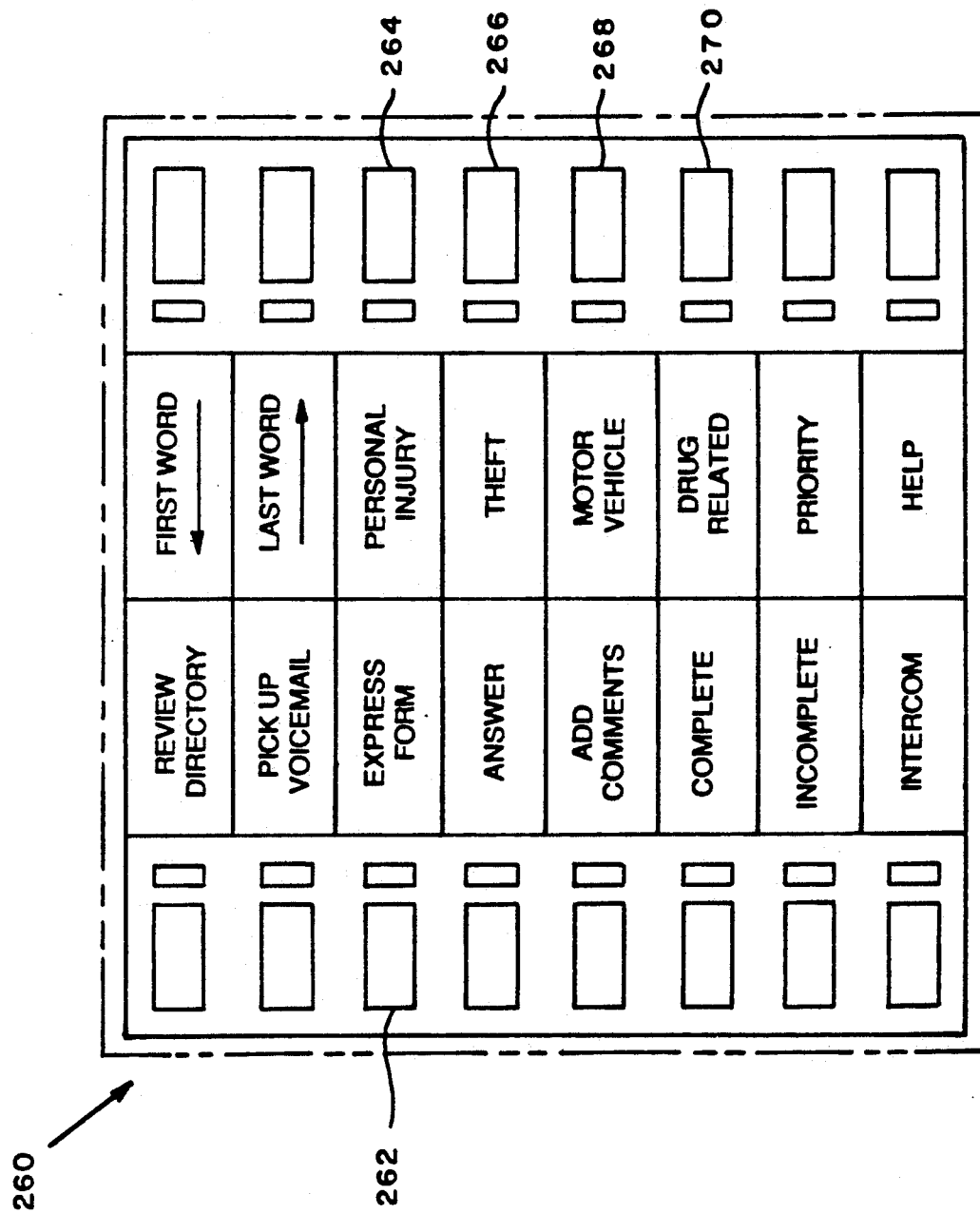
FIG. 6-B 5,265,075

VOICE PROCESSING SYSTEM WITH EDITABLE VOICE FILES

FIELD OF THE INVENTION

This invention relates to centralized dictation systems and, more particularly, to such systems in which voice files are stored in digital form.

BACKGROUND OF THE INVENTION

Central dictation systems utilizing digital storage of voice files are known. An example of such a system is the Digital Express System DX7000, sold by Dictaphone Corporation, described in British specification 2,201,863, published Sept. 7, 1988, and in U.S. Pat. No. 5,163,085; application Ser. No. 07/455,889. Such a system is also described in U.S. Pat. No. 5,033,077.

In typical usage of such a system, an author creates a voice file by dictating into a dictation terminal. The terminal includes a capability for editing the dictated material. That is, the author is able to insert new material into the file he is creating or to delete material from the file. The terminal also frequently includes a keypad by which the author can enter data relating to the voice file. It is well known for such system to support use of a standard tone pad telephone as a dictation terminal.

After the author has completed creation of a voice file, the recorded file is accessed by a transcriptionist. The file is played back to the transcriptionist, who uses a word processor or the like to prepare a text or document corresponding to the voice file.

It is also a known feature of digital dictation systems to permit access to recorded dictation files by an authorized listener or listeners. Such a listener can review the file before, during or after transcription or in lieu of transcription.

Central dictation systems (sometimes also known as "voice processing systems") have proved to be an efficient way for authors to initiate creation of documents. However, some authors find that they need to produce repetitively very similar documents or to construct documents following a prescribed format or to construct documents which contain repetitive sections. Examples of such documents are radiology reports, police reports, and legal documents. It is known for authors to direct a transcriptionist to transcribe a standard prerecorded voice file. Nevertheless, it is desired that more flexible and convenient ways be found for authors to produce repetitively documents of the types described above.

SUMMARY OF THE INVENTION

According to the invention, a voice processing systems includes:

(a) apparatus for prerecording a plurality of voice files;

(b) apparatus for selecting one of the prerecorded files;

(c) apparatus for recording a duplicate copy of the selected file; and (d) apparatus for editing the recorded duplicate copy.

According to another aspect of the invention, the system also includes apparatus for transmitting the edited copy to a transcriptionist.

According to a further aspect of the invention, the system also includes apparatus for playing back the edited copy to one or more listeners simultaneously.

BRIEF DESCRIPTION OF THE DRAWINGS

FIGS. 5-A and 5-B are a flow chart that illustrates a routine for accessing and editing a copy of a prerecorded voice file.

FIG. 6-A is a top view of a combined dictation terminal and telephone that may be used with the system of FIG. 1 and FIG. 6-B is an enlargement of a part of FIG. 6-A, showing in detail the programmed key section of the terminal.

DETAILED DESCRIPTION OF THE PREFERRED EMBODIMENTS

Figure 1:
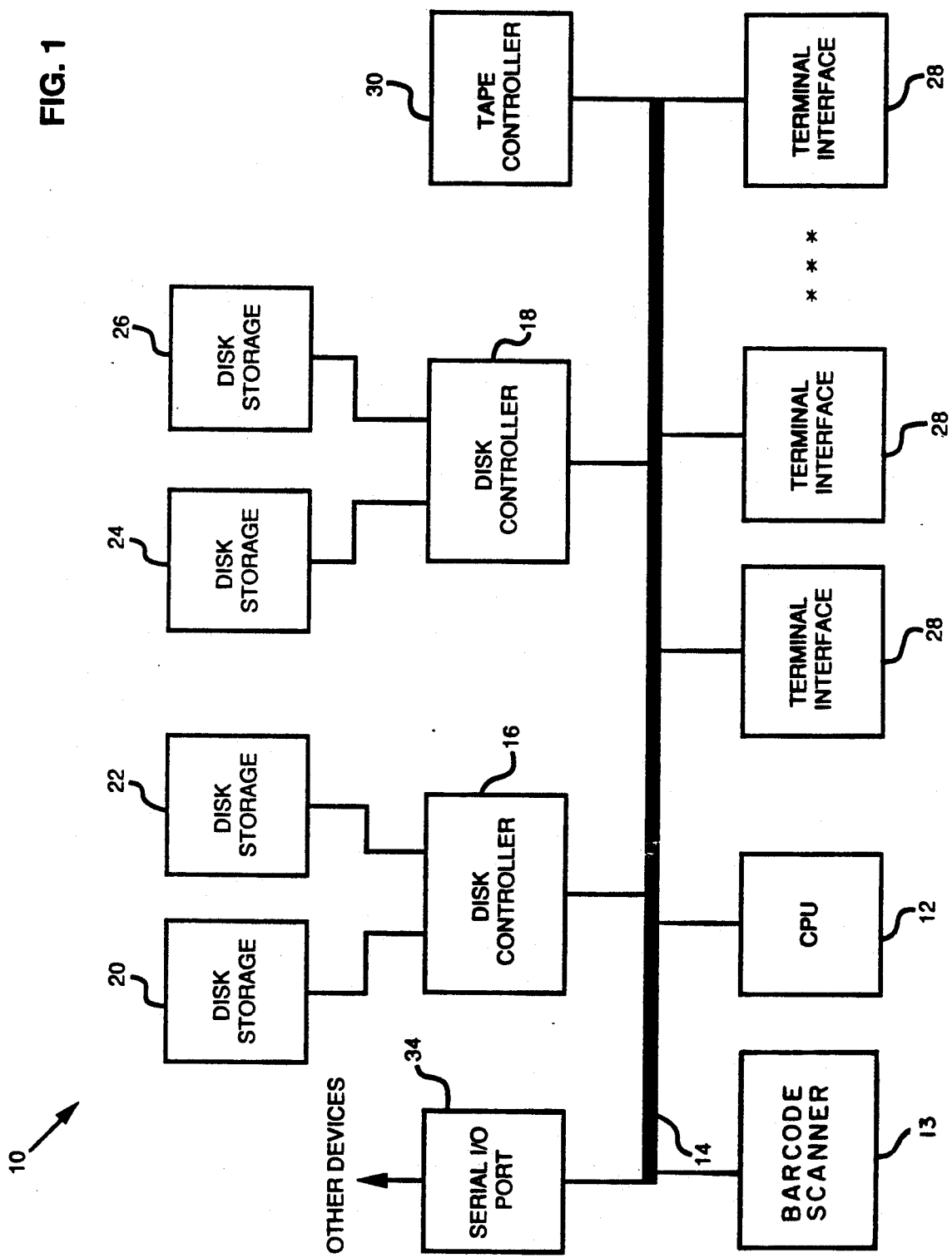
FIG. 1 is a block diagram of a voice processing system in accordance with the invention.

FIG. 1 illustrates in block diagram form the hardware making up a voice processing system 10 in accordance with the invention. System 10 includes (CPU 12, which may include a conventional microprocessor such as the model 80386 manufactured by Intel Corporation, Santa Clara, Calif., a direct memory access (DMA) chip and working memory in the form of random access memory (RAM). CPU 12 is connected to bus 14, which serves to connect CPU 12 to the other components of system 10. Also connected to bus 14 are disk controllers 16 and 18. Disk controller 16 is connected to, and controls, fixed disk storage devices 20 and 22 and disk controller 18 is connected to, and controls, fixed disk storage devices 24 and 26. Disk controllers 16 and 18 are conventional devices such as the Model H-SMD 451 available from Xylogics Inc., Burlington, Mass., and disk storage devices 20, 22, 24 and 26 are also conventional and may be, for example, Imprimis/Seagate 8", 2500 Megabyte, Winchester disk drives available from Imprimis/Seagate Corporation, Minneapolis, Minn.

System 10 also includes a number of terminal interface boards 28 which are also connected to bus 14. In a preferred embodiment of system 10 there are eight interface boards 28, each including and controlled by a conventional microprocessor like the Intel 8086 and a Digital Signal Processing device such as the TMS320C10 available from Texas Instruments, Dallas, Tex. and each supporting four telephone ports. System 10 therefore supports up to 32 simultaneous users.

Also connected to bus 14 is tape controller 30, which is a conventional device such as the model 431, QIC-02 multibus tape controller available from Xylogics Inc., Burlington, Mass. Tape controller 30 is used to read system software and prompts from magnetic tape for storage on one or more of disks 20, 22, 24 and 26.

There is also connected to bus 14 a serial input/output port 34, which permits connection of other devices to system 10. The other devices may include a conventional personal computer (not shown) which may be used by a system supervisor to manage and oversee the operation of system 10. The personal computer advantageously includes a printer that may be used to print reports of the activity of system 10.

As is this case with the aforementioned Digital Express System DX7000, system 10 is preferably operated so that one copy of each voice files, system software file, etc. is on simultaneously stored on two of disk storage devices 20, 22, 24 and 26, thereby providing complete storage redundancy in the event that one of those storage devices fail. System 10 also preferably will continue uninterrupted operation upon failure of one of those devices.

It should be noted that the particular hardware configuration just described is conventional and not essential to the subject invention. The subject invention could be embodied in a large variety of different hardware configurations that support digital storage and play back of voice files.

Operation of system 10 includes conventional creation of, and transcription of, voice files, which need not be described in detail for a complete understanding of the invention. It will be understood that voice files are created by authors using dictation terminals (not shown). The terminals are connected to system 10 via interfaces 28 and may be conventional dictate terminals, tone telephones, or hybrid devices such as the Connexions(r) terminal marketed by Dictaphone Corporation, Stratford, Conn., and described in U.S. Pat. No. 4,860,339. The terminals could also include, for example, a mobile telephone or a radio transceiver of the type used by law enforcement agencies.

After dictation of a voice file is complete, the file is assigned to a transcriptionist in a conventional manner as a dictation job or is available for listen access by authorized individuals. The transcriptionist accesses the file through a conventional transcription terminal (not shown) that is connected to a terminal interface 28. As is customary, the transcriptionist causes the voice file to be played back by system 10 so as to permit transcription of the voice file.

Figure 2:
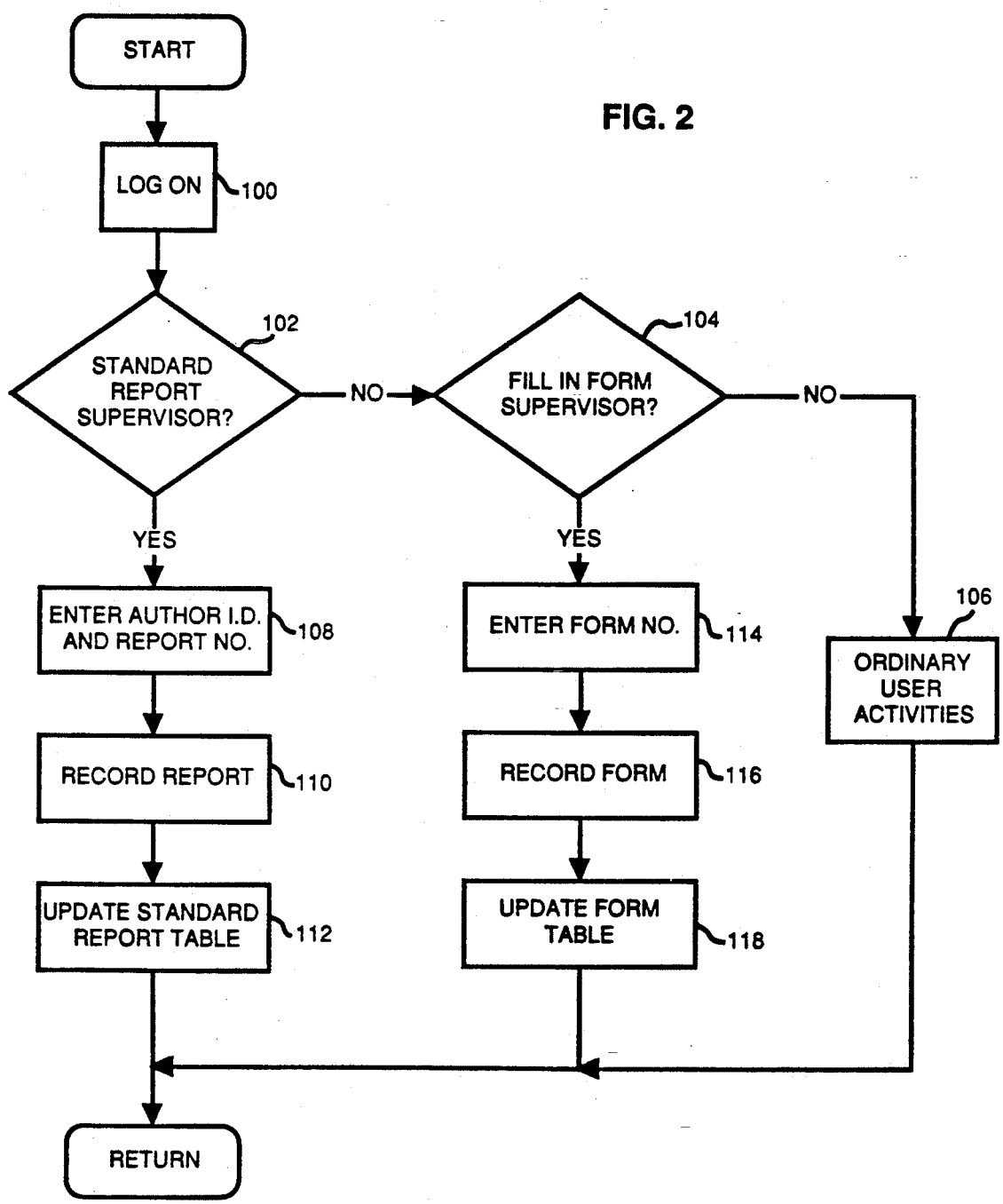
FIG. 2 is a flow chart that illustrates a routine for prerecording a standard voice file for storage in the system of FIG. 1.

FIG. 2 is a flow chart which illustrates a software routine whereby, in accordance with the invention, standard voice files may be prerecorded and stored in system 10. As will be seen, the routine of FIG. 2 permits prerecording of two type of files: (a) standard reports; and (b) fill in forms. Examples of standard reports include, for a hospital application, a radiologist's report of a normal X-ray, such as a "normal chest". Another example of a standard report would be, in a law firm, an attorney's letter acknowledging receipt of a file from an insurance company.

Fill in form voice files include a series of oral questions and/or prompts which direct an author to dictate responses that will permit a transcriptionist to prepare a document or complete a preprinted form. For example, in a police department, a fill in form file may be for preparing a motor vehicle accident report and therefore may include prompts directing a police office to dictate "date of accident", "time of accident", "location of accident", "make of vehicle number one", "license plate of vehicle number one" "driver of vehicle number one" and so forth. As another example, in a sales department a fill in form may be for preparing a sales order and therefore may include prompts directing a sales representative to dictate "customer name", "customer address", "items ordered", etc. Preferably each prompt or question is followed by a short pause.

Returning now to FIG. 2, the routine begins with step 100 at which a user logs onto the system. As will be appreciated by those skilled in the art, logging on includes entry by the user of an identification code or other information that identifies the user as some one who is authorized to use the system. It will also be appreciated that, in the case of a terminal dedicated to a single user, the identification code can be automatically entered upon the user's activation of the terminal, as by removing a handset from a cradle.

In a preferred mode of operation of system 10, prerecording of standard files will be restricted to one or a small number of system administrators. Accordingly, after log-on (step 100), it is determined whether the user is authorized to prerecord (or edit or delete) standard report voice files (step 102). If not, it is next determined whether the user is authorized to prerecord or edit or delete fill in form voice files (step 104). If not, the user is permitted to perform only activities available to non-supervisors (step 106) such as creation of conventional dictation files, or editing of copies of standard files, as will be described later.

If at step 102, the user is determined to be one who is authorized to prerecord standard report files, the user is given the option to prerecord such a file. If that option is activated, step 108 follows, at which the user enters the identification code identifying the author for whom the standard file is being prerecorded, and also a number that identifies the kind of standard report to be recorded. For example, as noted above, the author i.d. code may identify a certain radiologist who is an authorized user of the system and the report number may be the one assigned to a report of a "normal chest" x-ray.

Figure 3:
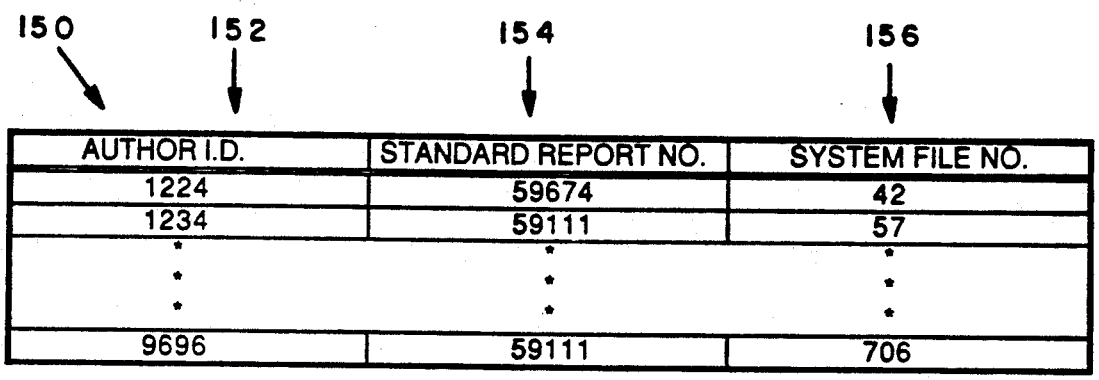
FIG. 3 is a schematic illustration of a table for accessing a first type of prerecorded voice file.

After step 108 is step 110, at which the user prerecords a standard report voice file. The recording which occurs at step 110 is of the same type that occurs during recording of a conventional dictation file, with the customary capabilities for editing the file and for signaling completion of the file. Upon completion of the file, the recorded standard report file is assigned a file number but is not made available for assignment to a transcriptionist, as would be the case for a conventional dictation file. Instead, system 10 updates a table which stores the locations of all standard report files (step 112). A schematic illustration of such a table is shown in FIG. 3. It will be noted that table 150 includes columns 152, 154 and 156, which correspond respectively to "Author I.D.", "Standard Report No." and "System File No." Thus, at step 112 the file number assigned to the standard report just recorded is listed in column 156. In the same row, the author i.d. number and report number entered at step 108 are respectively inserted in columns 152 and 154. As will be seen, those two numbers and table 150 will be used to access the prerecorded standard report.

Returning now to step 104, if it is determined at that step that the user is authorized to prerecord fill in form files, the user is given the option to prerecord such a file. If that option is activated, step 114 follows, at which the user enters the form number by which the form is to be identified.

Figure 4:
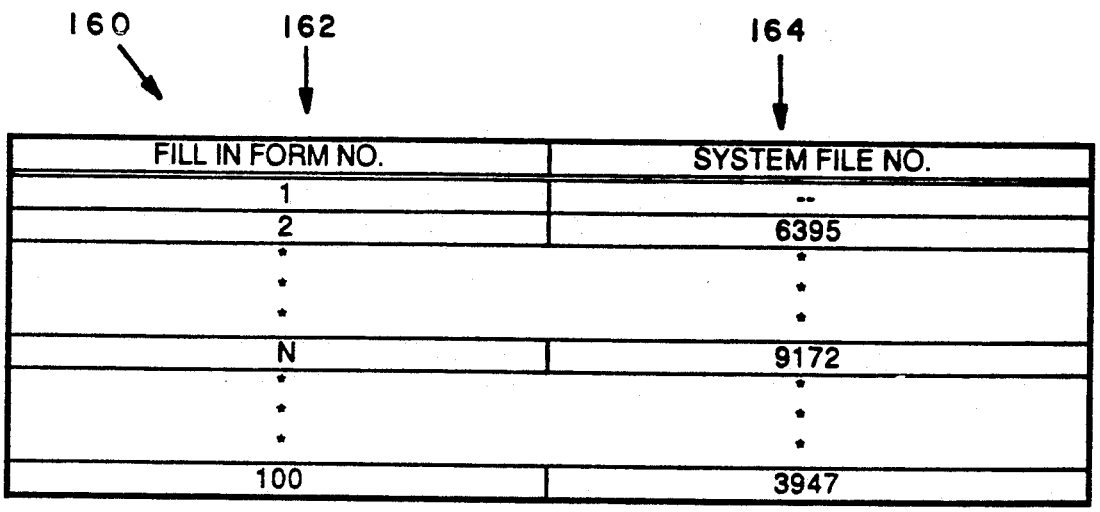
FIG. 4 is a schematic illustration of a table for accessing a second type of prerecorded voice file.

After step 114 is step 116, at which the user prerecords the fill in form. As was the case in step 110, the recording proceeds as for a conventional dictation file, and on completion the file is not assigned for transcription. Rather, step 118 follows, at which the system file number assigned to the fill in form is inserted in a table (indicated by reference character 160, FIG. 4). Table 160 is seen to have columns 162 and 164 corresponding respectively to "Fill In Form No." and "System File No." It will be understood that the system file number assigned at the completion of step 116 is placed in column 164 and the form number entered at step 114 is placed in the same row but in column 162. Table 160 and the form number will be used to access the prerecorded fill in form.

Summarizing then what has just been described, on completion of step 112 or 118, as the case may be, prerecorded standard voice file has been stored on at least one of disks 20, 22, 24 and 26 and a standard file access table has been updated to include an entry corresponding to the file just recorded.

As will be appreciated by those skilled in the art, system administrators will be able to delete or edit prerecorded standard files in accordance with procedures similar to those just described for prerecording files. The procedures for editing and deleting the prerecorded files will be well understood in light of the description of FIGS. 2-4 and need not be described in detail.

Accessing and copying of prerecorded standard files, and editing of the copies, will now be described with reference to FIGS. 5-A and 5-B.

The routine of FIGS. 5-A and 5-B begins with log on (step 200), which includes entry of the user's identification number. Following step 200 is step 202 at which the user enters, preferably in response to prompts, information relating to the file that the user wishes to create. Entry of that information may be accomplished by actuating keys of a terminal's key pad, by scanning a bar code with a scanning device (such as that described in above mentioned U.S. Pat. No. 5,033,077) or by other conventional means. The entered information is typically in the form of a series of digits and may include, in a typical operating environment such as a hospital, a subject number (which may be a patient identification number or a medical record number), a department number (representing, e.g., radiology or internal medicine), and a work type. The work type is typically a code of three digits or longer representing, for example, a report of a medical history, or a physical examination, or a operative or postoperative report. As will be seen, in accordance with the invention, the work type may instead indicate the user desires to access a prerecorded standard report or fill in form.

In a preferred mode of operating system 10, a unique five digit worktype is associated with each variety of standard report and, except for worktypes associated with standard reports, all other work types are three digits. Thus at step 204, which follows step 202, the system determines whether the worktype entered at step 202 exceeded three digits in length. If so, the system recognizes that access to a standard report is being requested. Step 206 therefore follows, at which the system accesses the table 150, and uses the user i.d. entered at step 200 and the worktype entered at step 202 (which worktype is a standard report number) to determine the file number assigned to the requested prerecorded standard report. There follows next step 208, at which the system opens a new file, to which a new system file number is assigned, and then copies the contents of the requested standard report file into the new file. The system then proceeds to step 210, at which it plays back the new (i.e. copy) file from the beginning while permitting the user to edit the copy file in the same manner as if the user had just dictated the file.

All of the customary functions applicable to a conventional dictation file are applicable to the copy file. These functions include recording, inserting, deleting, rewinding, fast forwarding, or moving to a particular point within the file.

After the user has made any desired insertions or deletions to the copy file, the user signals completion in the same manner as for conventional dictation. The copy file is then stored, processed and assigned to, and played back by, a transcriptionist in the same manner as a conventional dictation job (step 212). It will be seen, then that a prerecorded standard report file has been selected and copied, the copy edited and the edited copy transmitted to a transcriptionist.

An advantage of the standard report voice file as described in connection with FIGS. 2, 3, 4, 5-A and 5-B is that each author may have conveniently available his or her own customized version of a standard report. For example, it is to be expected that every radiologist who works in a hospital will frequently have occasion to prepare a report of a normal chest x-ray. However, each may have his or her own preferred way of describing a "normal chest." This is easily accommodated in system 10 by assigning a 5 digit worktype, say '59111' to the "normal chest" standard report and then arranging for the system supervisor to record for each author his or her preferred wording for a "normal chest". As will by now be clear, each author may then access his or her particular "normal chest" standard report file simply by logging on and then entering '59111'. Reference to FIG. 3 will indicate that if the author identified by code 1234 enters '59111' as a work type, system file number 57 will be accessed, copied and the copy made available for editing. Similarly the author having i.d. code 9696 would access system file number 706 by entering '59111' as a worktype.

It will be appreciated that an author's standard report may include pauses in which may be inserted information such a patient's name, age, sex and/or patient number. It should also be noted that an author is free during step 210 (FIG. 5-A) to add or delete information as desired. For example, a "normal chest" report may readily be amended to add a description of a minor abnormality.

In an alternative embodiment of system 10, a default or "house" standard report could be automatically accessible by entry of a 5-digit worktype if the user has not previously had prerecorded his or her own custom report corresponding to that work type. One way in which this could be done is for system 10 to access a second standard report table if a search of table 150 provided no listing that matched both the user's i.d. and the entered worktype. The second table would consist of two columns—one for standard report numbers and the other for the system file numbers of corresponding prerecorded house standard reports. It will be appreciated that the second table would be used to access the prerecorded house report, which would then be copied and the copy made available for editing, etc., as described before.

In another alternative embodiment of system 10, two or more authors may share the same custom standard report. This could be implemented by appropriate editing of table 150. Assume, for example, that a second author wishes to share a first author's prerecorded "normal chest" report, to which worktype '59111' has been assigned. In one possible approach to this embodiment, the supervisor's session described in connection with steps 108-112 of FIG. 2 is modified so that after step 108 (entry of second author's i.d. and '59111') the supervisor is allowed to select a report sharing option, and then to input the first author's i.d. to select the report to be shared. Step 110 would then be omitted and at step 112 a new entry would be made consisting of the second author's i.d., report number (59111) and the same system file number as is listed for the first author's "normal chest."

It should be noted that both of the report sharing and house report features above described could be included in a single alternative embodiment.

Returning now to FIGS. 5-A and 5-B, accessing, copying and editing of fill in forms will be discussed.

If at step 204 it was determined that the worktype did not exceed three digits in length, step 214 follows. At step 214 it is determined whether the worktype is one that has been assigned to a fill in form. If not, conventional creation and editing of a dictation file follows (step 216). Otherwise, step 218 follows, at which the system accesses table 160, and uses the worktype (which by assumption is a fill in form number) to determine the file number assigned to the requested prerecorded fill in form. There follows step 220, at which the system opens a new file, to which a new system file number is assigned, and then copies the contents of the requested fill in form file into the new file. The system then proceeds to step 222, at which it plays back the new (i.e. copy) file from the beginning while permitting the user to edit the copy file in the same manner as if the file had just been dictated.

As previously discussed, each prerecorded form contains a series of questions or prompts that lead the user to insert the appropriate information. Preferably there is a short pause following each question or prompt. In an alternative embodiment of system 10, the fill in form file includes after each question or prompt a special code that suspends playback of the copy file until the user takes some action (such as inserting information) that causes playback to resume. In still another alternative embodiment of system 10, the fill in form file includes after each question or prompt a code that suspends playback of the copy file for 10 seconds or until the user takes some action. In any event, users trained in completing fill in forms understand that the questions and prompts are not to be deleted, since the questions and prompts will be used by transcriptionist as a guide to inserting the added information at appropriate places in the form or document to be prepared by the transcriptionist.

In a preferred application of system 10 several fill in forms may be chained together to form a complex report. For example, in a law enforcement environment, a single accident report may include several "vehicle" forms, one for each vehicle involved in the accident, and also several "victim" forms. System 10 therefore supports a command that allows a user, upon completion of a fill in form, to append another fill in form. Thus, following step 222, there is a step 224 at which it is determined whether an "append" command has been entered. If not, step 212 follows, at which, as before, the completed job is transmitted for transcription. Otherwise, the user is prompted to enter the worktype (step 226) for the next fill in form (which may be the same as the form just completed), and the routine again cycles through steps 218, 220, 222 and 224. In this way, the user may chain together as many fill-in forms as desired, subject only to the recording capacity of system 10. When at step 224 the user completes a fill in form without appending a further form, all the completed copy files that have been chained together are assigned to a transcriptionist as a single dictation job.

Reference was previously made to use of a Connexions(R) terminal with system 10. A top view of such a terminal is shown in FIG. 6-A. The terminal, denoted by reference numeral 250, is described in above-cited U.S. Pat. No. 4,860,339 and so need not be described in detail here. Terminal 250 includes a programmable key section 260, of which an enlarged view is provided in FIG. 6-B. Advantageously, some of the keys of section 260 are programmed so as to facilitate accessing of fill in forms. For example, as shown in FIG. 6-B, the legend "EXPRESS FORMS" is associated with key 262, and the legends "PERSONAL INJURY", "THEFT", "MOTOR VEHICLE" and "DRUG RELATED" are respectively associated with keys 264, 266, 268 and 270. It will be understood that keys 262, 264, 266, 268 and 270 are programmed so that depressing key 262 followed by, for instance key 264, automatically causes terminal 250 to transmit to system 10 data required for the user to log on and request access to a fill in form for reporting a personal injury. Similarly, depressing key 262 followed by one of keys 266, 268, 270 allows automatic access to the respective forms represented by those keys.

In an alternative mode of operating system 10, generation of standard reports in hard copy is facilitated by linking system 10 to a management information system or a word processing system (either of which shall hereinafter be referred to as a "document generation system"). The document generation system stores standard reports in text form. If the user does not wish to edit or modify that standard report, the document generation system can automatically generate the hard copy upon the user's accessing of the corresponding voice file, entering identifying data (such as a patient's i.d. code) and then entering an appropriate code. The modification of a standard report is also easily accomplished by a transcriptionist who accesses the corresponding text file and edits it in accordance with changes made by the author on the copy voice file.

As is known to those skilled in the art, an advantage of conventional digital voice processing systems is that several listeners may simultaneous access, and listen to, the same voice file. As noted above, simultaneous use of system 10 by up to 32 users is provided for. Such use may include access to prerecorded voice files for the purpose copying and then editing the copy files. Thus the hardware and software routines previously described allow multiple users to simultaneously access, and edit respective copies of, a single prerecorded file. Multiple users may also simultaneously access, and edit respective copies of, different prerecorded files. Assuming that multiple system administrators have been authorized, system 10 also allows the administrators to simultaneously prerecord different standard report and/or fill in form files.

In a preferred embodiment of system 10, a user is permitted to speed up (or slow down) the rate of playback of a voice file by appropriate action of controls on a dictation terminal. A method of time scale modification that provides for nondistorted playback of voice files at various selected rates is described in U.S. patent application Ser. No. 07/673,042, filed Mar. 21, 1991, entitled "Time Scale Modification of Speech Signals" and assigned to the assignee of this application. The disclosure of said application Ser. No. 07/673,042 is incorporated herein by reference. The speeding up of playback is particularly useful in the editing of a fill in form copy file, as a user who is familiar with the fill in form can rapidly advance from one pause between questions to the next. The speed-up feature is similarly useful in allowing rapid review and/or editing of a standard report copy file.

While the invention has been disclosed and described with reference to a limited number of embodiments, it is apparent that variations and modifications may be made therein and it is therefore intended in the following claims to cover each such variation and modification as falls within the true spirit and scope of the invention.

What is claimed is:

1. A voice processing system comprising:
   first means for recording and editing voice files;
   second means for prerecording a plurality of standard voice files for storage by said first means;
   third means for selection one of said prerecorded standard files;
   fourth means for recording a duplicate copy of said selected standard file; and
   fifth means for editing said recorded duplicate copy.

2. The system of claim 1, further comprising sixth means for transmitting said edited copy to a transcriptionist.

3. The system of claim 1, wherein said first means comprises a plurality of dictation terminals and at least one magnetic disk storage device operatively connected to said dictation terminals.

4. The system of claim 1, wherein said third means comprises means for storing a standard voice file table, said table comprising a plurality of entries, each of said entries corresponding to one of said prerecorded voice files.

5. The system of claim 4, wherein each of said entries comprises an author code and a standard report code, each said author code corresponding to an authorized user to said system, each said standard report code corresponding to a kind of standard report be generated by said user.

6. The system of claim 5, wherein said third means further comprises means for entering an author code and a standard report code, said third means responding to entry of said codes by accessing said table and accessing said prerecorded voice file corresponding to said entered codes.

7. The system of claim 6, wherein said means for entering comprises a keypad.

8. The system of claim 6, wherein said means for entering comprises a bar code scanner.

9. The system of claim 1, further comprising means for allowing an authorized individual to access and review said edited copy.

10. The system of claim 1, further comprising means for allowing each of a plurality of users to simultaneously edit a respective duplicate copy of a standard file.

11. The system of claim 1, further comprising means for allowing each of a plurality of users to simultaneously select a respective one of said prerecorded standard files and to simultaneously edit a respective copy of said one selected file.

12. The system of claim 1, wherein said fifth means comprises means for playing back said copy in audible form, means for inserting material into said copy, and means for deleting material from said copy.

13. A voice processing system comprising:
   (a) means for prerecording a plurality of voice files;
   (b) means for associating with each said prerecorded file a unique file identifying code;
   (c) means for receiving a file request signal, said signal comprising one of said codes;
   (d) means, responsive to receipt of said signal, for recording a duplicate copy of said prerecorded file that corresponds to said one code; and
   (e) means for editing said recorded copy.

14. The system of claim 13, further comprising means for transmitting said edited copy to a transcriptionist.

15. The system of claim 13, wherein said means for associating comprises means for storing a table, said table comprising a plurality of entries, each said entry comprising one of said file identifying codes.

16. The system of claim 13, wherein said means for prerecording comprises a dictation terminal and a magnetic disk storage device operatively connected to said dictation terminal.

17. In a central dictating machine having means for recording voice files, a method of preparing a voice file, comprising the steps of:
   (a) prerecording a plurality of standard voice files;
   (b) selecting one of said prerecorded standard files;
   (c) recording a duplicate copy of said selected standard file; and
   (d) editing said recorded duplicate copy.

18. The method of claim 17, further comprising the step of transmitting said edited copy to a transcriptionist.

19. The method of claim 17, further comprising the step of updating a standard voice file table after prerecording one of said standard files, said updated table comprising an entry corresponding to said one file, said entry comprising a system file number, an author code and a standard file code.

20. The method of claim 19, wherein said selecting step comprises entering said author code and said standard file code.

21. The method of claim 17, wherein said prerecording step comprises dictating a series of questions or prompts to guide a user of the machine in supplying information for completion of a preprinted form.

22. The method of claim 21, wherein said prerecording step further comprises inserting a pause code after each of said questions or prompts, said pause code being for suspending playback of said duplicate copy.

23. The method of claim 22, wherein said pause code suspends said playback for an indefinite period until a user takes action to resume playback.

24. The method of claim 22, wherein said pause code suspends said playback for the earlier of 10 seconds or until a user takes action to resume playback.

* * * * *